UNITED STATES PATENT OFFICE.

JOHANN HUISMANN, OF COLOGNE, GERMANY, ASSIGNOR TO SYNTHETIC PATENTS CO., INC., OF NEW YORK, N. Y., A CORPORATION OF NEW YORK.

YELLOW AZO DYE.

1,159,386.  Specification of Letters Patent.  Patented Nov. 9, 1915.

No Drawing.   Application filed November 5, 1914.   Serial No. 870,453.

*To all whom it may concern:*

Be it known that I, JOHANN HUISMANN, doctor of philosophy, chemist, citizen of the German Empire, residing at Cologne, Germany, have invented new and useful Improvements in Yellow Azo Dye, of which the following is a specification.

I have found a new process for the production of new and valuable azo dyes by combining the diazo compounds of aminothiazoledisulfonic acids with acetoacetic-arylamids. The new coloring matters dye cotton in pure yellow shades of excellent fastness to light. They are after being dried and pulverized yellowish powders soluble in water and in concentrated sulfuric acid generally with a yellowish coloration; yielding upon reduction with stannous chlorid and hydrochloric acid an aminothiazoledisulfonic acid having most probably one sulfonic group in ortho position to the amino group, the other component being split up.

The new aromatic aminothiazoledisulfonic acids can be produced by heating preferably *in vacuo* dehydrothiotoluidin, its homologues or substitution products or the corresponding primulin compounds, such as the sulfo acids of dehydrothiotoluidin and the new dehydrothiotoluidin acids described in application Serial No. 842,459, with one molecule of sulfuric acid by the so-called baking process and sulfonating the resulting aminothiazolemonosulfonic acids, or by heating preferably *in vacuo* dehydrothiotoluidin, its homologues or substitution products and the corresponding primulin compounds with 2 molecules of sulfuric acid or with an excess of 2 molecules of sulfuric acid by the so-called baking process, or by heating preferably *in vacuo* the known monosulfonic acids of dehydrothiotoluidin, its homologues or substitution products or the corresponding primulins with one molecule of sulfuric acid or an excess of one molecule of sulfuric acid by the so-called baking process. The new compounds have probably the one sulfonic group in ortho position to the amino group.

The following example is an illustration for the production of the new sulfonic acids:—240 parts of dehydrothiotoluidin are intimately mixed with a solution of 147 parts of monohydrated sulfuric acid in water and then evaporated to dryness. The powdered product thus obtained is then heated in an oil bath for 4–5 hours *in vacuo* to temperatures of from 235–250° C. in a vessel provided with a stirrer and a downwardly inclined condenser. The process is complete as soon as the distillation of water ceases. The product is dissolved in water with the addition of alkali.

The sodium salt of the new dehydrothiotoluidin-monosulfonic acid crystallizes from the filtered liquid in colorless leaflets. The acid forms a yellow diazo compound soluble in water with difficulty. 320 parts of the dehydrothiotoluidin-monosulfonic acid thus obtained are slowly introduced into 1500 parts of monohydrated sulfuric acid at a temperature below 50° C. Subsequently 3000 parts of fuming sulfuric acid (65 per cent. of $SO_3$) are added and the mixture is kept at 80 to 90° C. during 12 hours until a test portion is soluble in hot water. The mass of the reaction is then poured into ice water and the precipitate is filtered off. The dehydrothiotoluidindisulfonic acid crystallizes from water in yellow leaflets. 444 parts of the sodium salt of the dehydrothiotoluidindisulfonic acid thus obtained are dissolved in water. 400 parts of crude hydrochloric acid are added and the resulting mixture is diazotized with 69 parts of sodium nitrite at a temperature of about 25° C. The diazo solution is slowly added at 25° C. to an aqueous suspension of 207 parts of aceto-acetic-ortho-anisidid containing 300 parts of soda. When the combination is finished the mixture is heated until the dyestuff is completely dissolved and the latter is then precipitated from the hot solution by addition of common salt. The new dye having most probably in the shape of the sodium salt the formula:

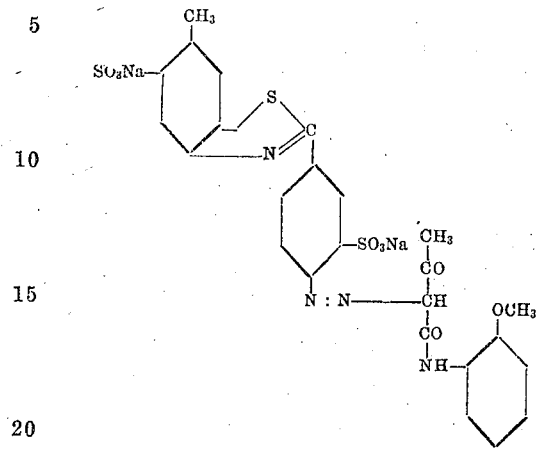

is after being dried and pulverized a yellow powder soluble in water and in concentrated sulfuric acid with a yellow coloration; and yielding upon reduction with stannous chlorid and hydrochloric acid the new dehydrothiotoluidin disulfonic acid containing most probably one sulfonic group in ortho position to the amino group, the other component being split up. It yields on cotton beautiful greenish-yellow shades very fast to light. In the same way other of the new aromatic aminothiazoledisulfonic acids such as for instance dehydrothio-meta-xylidin-disulfonic acid, the primulin-disulfonic acids, prepared according to the above described baking process, may be used.

Instead of the aceto-acetic-arylamid mentioned in the example, its homologues and substitution products, such as for instance the aceto-acetic-meta-xylidid, aceto-acetic-chloro-anilid, -para-anisidid, -cresidid (meta-aceto-acetylamido-para-methoxy-toluene), can be used as coupling components.

I claim:—

1. The herein described new azo dyes being derived from new aminothiazoledisulfonic acids having most probably one sulfonic group in ortho position to the amino group and an aceto-acetic-arylamid, which are after being dried and pulverized yellowish powders soluble in water and in concentrated sulfuric acid generally with a yellowish coloration; yielding upon reduction with stannous chlorid and hydrochloric acid an aminothiazole-disulfonic acid having most probably one sulfonic group in ortho position to the amino group; the other component being split up; and dyeing cotton pure yellow shades of excellent fastness to light, substantially as described.

2. The herein described new azo dyes being derived from the disulfonic acid of an aminoarylbenzothiazole compound having most probably one sulfonic group in ortho position to the amino group and an aceto-acetic-arylamid, which are after being dried and pulverized yellowish powders soluble in water and in concentrated sulfuric acid generally with a yellowish coloration; yielding upon reduction with stannous chlorid and hydrochloric acid the disulfonic acid of an aminoarylbenzothiazole-disulfonic acid having most probably one sulfonic group in ortho position to the amino group, the other component being split up; and dyeing cotton pure yellow shades of excellent fastness to light, substantially as described.

3. The herein described new azo dyes being derived from the disulfonic acid of a μ-aminophenyl-methyl-benzothiazole compound having most probably one sulfonic group in ortho position to the amino group and an aceto-acetic-arylamid, which are after being dried and pulverized yellowish powders soluble in water and in concentrated sulfuric acid generally with a yellowish coloration; yielding upon reduction with stannous chlorid and hydrochloric acid the disulfonic acid of a μ-aminophenyl-methyl-benzothiazole compound having most probably one sulfonic group in ortho position to the amino group, the other component being split up; and dyeing cotton pure yellow shades of excellent fastness to light, substantially as described.

4. The herein described new azo dyes being derived from the disulfonic acid of an aminoarylbenzothiazole compound having most probably one sulfonic group in ortho position to the amino group and an aceto-acetyl-alkyloxy-arylamid which are after being dried and pulverized yellowish powders soluble in water and in concentrated sulfuric acid generally with a yellowish coloration; yielding upon reduction with stannous chlorid and hydrochloric acid the disulfonic acid of an aminoarylbenzothiazole-disulfonic acid having most probably one sulfonic group in ortho position to the amino group, the other component being split up; and dyeing cotton pure yellow shades of excellent fastness to light, substantially as described.

5. The herein described new azo dyes being derived from the disulfonic acid of an aminoarylbenzothiazole compound having most probably one sulfonic group in ortho position to the amino group and an aceto-acetylamido-oxybenzene compound which are after being dried and pulverized yellowish powders soluble in water and in concentrated sulfuric acid generally with a yellowish coloration; yielding upon reduction with stannous chlorid and hydrochloric acid the disulfonic acid of an aminoarylbenzothiazole-disulfonic acid having most probably one sulfonic group in ortho position to the amino group, the other component being split up; and dyeing cotton pure yellow shades of excellent fastness to light, substantially as described.

6. The herein described new azo dyes being derived from the disulfonic acid of a μ-aminophenyl-methylbenzothiazole compound having most probably one sulfonic group in ortho position to the amino group and an aceto-acetylamido-alkyloxy-benzene compound, which are after being dried and pulverized yellowish powders soluble in water and in concentrated sulfuric acid generally with a yellowish coloration; yielding upon reduction with stannous chlorid and hydrochloric acid the disulfonic acid of a μ-aminophenyl-methylbenzothiazole compound having most probably one sulfonic group in ortho position to the amino group, the other component being split up; and dyeing cotton pure yellow shades of excellent fastness to light, substantially as described.

7. The herein described new azo dyes being derived from the disulfonic acid of μ-aminophenyl-methylbenzothiazole having most probably one sulfonic group in ortho position to the amino group and an aceto-acetylamido-methoxybenzene, which are after being dried and pulverized yellowish powders soluble in water and in concentrated sulfuric acid generally with a yellowish coloration; yielding upon reduction with stannous chlorid and hydrochloric acid the disulfonic acid of μ-aminophenyl-methylbenzothiazole having most probably one sulfonic group in ortho position to the amino group, the other component being split up; and dyeing cotton pure yellow shades of excellent fastness to light, substantially as described.

8. The herein described new azo dye having most probably in the shape of its sodium salt the formula:

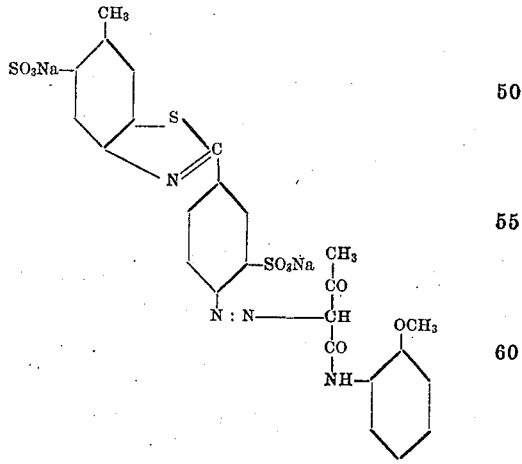

which is after being dried and pulverized a yellow powder soluble in water and in concentrated sulfuric acid with a yellow coloration; yielding upon reduction with stannous chlorid and hydrochloric acid a new dehydrothiotoluidin-disulfonic acid having most probably a sulfonic group in ortho position to the amino group; the other component being split up; and dyeing cotton beautiful greenish-yellow shades fast to light, substantially as described.

In testimony whereof I have hereunto set my hand in the presence of two subscribing witnesses.

JOHANN HUISMANN.

Witnesses:
J. D. ZIESEAKE,
ABE SCHOENTHAL.